United States Patent [19]

Lidman

[11] Patent Number: 4,970,989
[45] Date of Patent: Nov. 20, 1990

[54] METHOD AND ARRANGEMENT FOR MEMBRANE FILTRATION OF MILK IN CONNECTION WITH MILKING

[75] Inventor: Magnus Lidman, Tumba, Sweden
[73] Assignee: Alfa-Laval AB, Tumba, Sweden
[21] Appl. No.: 435,466
[22] PCT Filed: Jun. 1, 1988
[86] PCT No.: PCT/SE88/00300
§ 371 Date: Nov. 29, 1989
§ 102(e) Date: Nov. 29, 1989
[87] PCT Pub. No.: WO88/09613
PCT Pub. Date: Dec. 15, 1988

[30] Foreign Application Priority Data
Jun. 5, 1987 [SE] Sweden ............................. 8702363

[51] Int. Cl.$^5$ ............................................. A01J 7/00
[52] U.S. Cl. ............................. 119/14.01; 119/14.02; 210/195.2; 210/651
[58] Field of Search ............... 119/14.01, 14.02, 14.08, 119/14.24, 14.26; 137/15; 210/195.2, 651

[56] References Cited

U.S. PATENT DOCUMENTS 4,175,514 11/1979 Souza et al. ............... 119/14.08

FOREIGN PATENT DOCUMENTS 3321752 12/1984 Fed. Rep. of Germany ... 119/14.02

Primary Examiner—John Weiss
Attorney, Agent, or Firm—Hovey, Williams, Timmons & Collins

[57] ABSTRACT

During milking of dairy animals, the produced milk is membrane filtered and transported to a container or other end unit (1). From this end unit, the milk is led by way of a balance tank (6) to a circulation path, of which the membrane filter (10) is a part. The permeate obtained during membrane filtration is returned to the end unit and used to press forward milk from the end unit and from the other equipment in the filtration unit between the end unit (1) and the membrane filter (10).

4 Claims, 1 Drawing Sheet

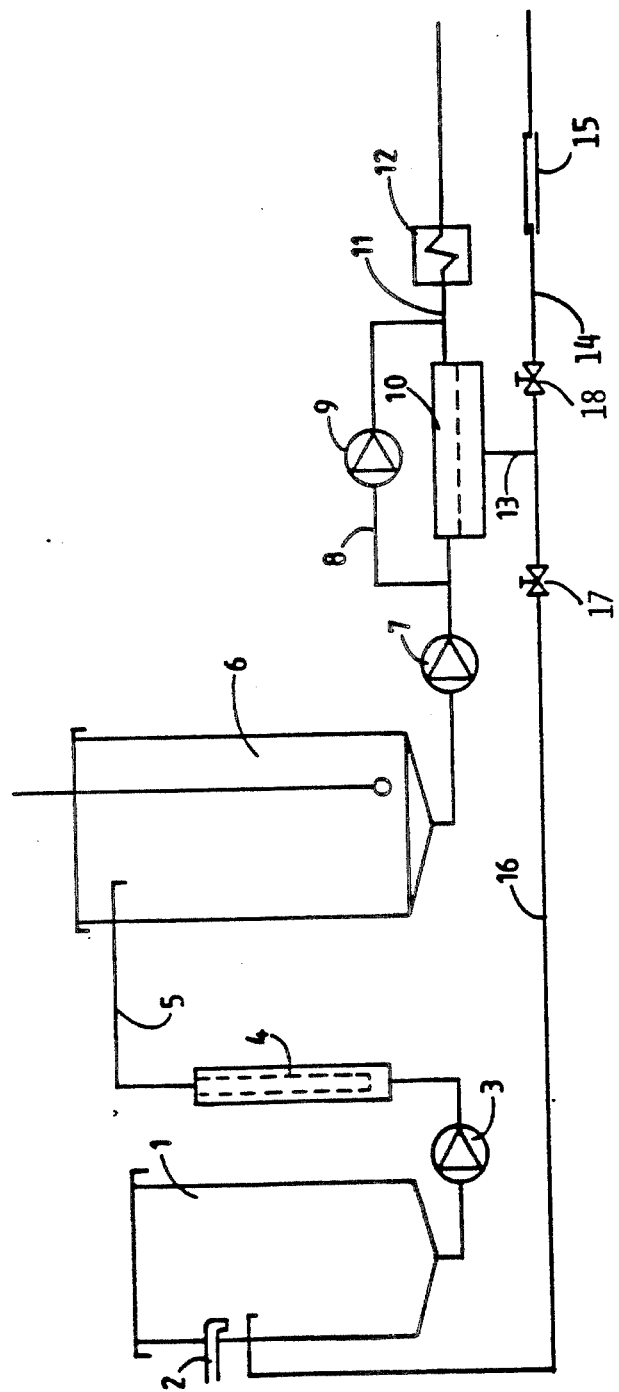

4,970,989

METHOD AND ARRANGEMENT FOR MEMBRANE FILTRATION OF MILK IN CONNECTION WITH MILKING

BACKGROUND OF THE INVENTION

1. Field of the Invention

The present invention relates to a method and an arrangement for membrane filtration of milk in connection with milking.

2. Description of the Related Art

When cows are milked by means of milking machines the flow varies very strongly. The variation is caused partly by the construction of the milking plant and partly by the physiological properties of the cows.

Milking plants work with vacuum and the milk is transported through a pipe line system, which has a vacuum which is fairly equal, to a container usually called an end unit. From this container the milk is pumped, under atmospheric pressure, through a pipe line to a cooling tank or some other storage vessel.

When milk is membrane filtrated in connection to the milking, a membrane filter is connected to the milking plant by way of a balance tank. From this the milk is pumped to a circulation path comprising the membrane filter, in which the milk is divided into two fractions, a concentrate and a permeate. Depending on the choice of filter media these fractions have a different composition. If the milk is to be concentrated by way of ultrafiltration, the permeate consists of water, milk sugar and low molecular salts. If the concentration takes place by way of reverse osmosis the permeate consists of water obtained from the milk.

The membrane filtration usually takes place in direct connection to the milking. After the milking the milk has a temperature of about 35° C. and considering the shelf life it is important that the time the milk is kept at this temperature is kept as short as possible.

The milk is transported from the end unit by way of a milk filter, in which coarser contaminations are separated off, to the balance tank and is from there pumped to the circulation path of the membrane filter.

When the level in the balance tank has fallen to a certain predetermined value, the pump which transports the milk to the circulation path stops. At this time there are consequently residues of milk in the end unit, in the pipe lines between this unit and the balance tank and in this tank.

The milking plant as well as the components which are included in the membrane filtration equipment must be cleaned after each milking. The milk which is left in the plant will if no measures are taken be lost during the washing and consequently represents a loss to the milk producer.

SUMMARY OF THE INVENTION

According to the invention it is therefore proposed that permeate obtained during the membrane filtration is used to press forward milk from the end unit in the milking plant and from the pipe lines between the same and the membrane filter, when the milking is ended.

An arrangement for membrane filtration of milk in connection with milking comprises a so called end unit, a balance tank and pumps to transport the milk from these units and a circulation path comprising a circulation pump and a membrane filter and pipes for transport of concentrate and permeate. The arrangement according to the invention also comprises a pipe line to return permeate to the end unit.

According to the invention there is obtained an increased yield of milk concentrate. By pressing forward the milk by means of permeate, that is a product which has been obtained from the milk, no oppositions could be made from a food technical point of view, the more since the permeate (used for pressing forward the milk) according to the invention is produced in direct connection with the pressing forward of the milk and is not stored during the production phase. If ordinary tap water is used there is always a risk for contamination, especially in such an exposed environment as a stall.

The method and the arrangement according to the invention are described further with reference to the attached drawing which shows an example of how a membrane filtration equipment is connected to the end unit in a milking plant.

BRIEF DESCRIPTION OF THE DRAWING

The FIGURE is a schematic view of the apparatus for membrane filtration of milk in connection with milking in accordance with the present invention.

DESCRIPTION OF THE PREFERRED EMBODIMENT

In the drawing there is shown an end unit 1 to which milk is transported under vacuum by way of a pipe line 2. From the end unit 1 the milk is transported by a pump 3 through a milk filter 4 in a pipe line 5 to a balance tank 6 provided with a level guard. From the balance tank 6 the milk is transported by a pump 7 to a circulation path comprising a pump 9 and an ultra filter 10. From the circulation path there is removed a concentrate flow by way of a pipe 11 which flow is heat treated in a heat exchanger 12 and from this is transported to a cooling tank not shown in the drawing. The permeate is obtained from the ultra filter by way of a pipe line 13, which during the time the milking takes place, is connected to a pipe line 14 for transport of permeate. The pipe line 14, which e.g. may be connected to a system for distribution of liquid to the cows and at that may be used as a liquid for these, is with advantage provided with a transparent section 15 arranged within sight of the person who milks the cows. With such an arrangement this person may easily see that the filter works in a correct way. If a leakage should occur the permeate will no longer be clear but become muddy with milk fat and proteins. Between the pipe line 13 and the balance tank 1 there is a pipe line 16, through which permeate may be returned to the balance tank 1. This transparent section may of course be located at some other place in the permeate pipe line. In the pipe line 16 there is a valve 17 and in the pipe line 14 a valve 18.

The method according to the invention is with advantage carried through in the following way. When the last group of cows is milked the operation activates the programme or sequence for emptying the milk from the milk holding and membrane filtration equipment. The milk which is obtained from the balance tank 6 is treated in the ultra filter until the level in the balance tank falls under a certain position. This means that the programme for emptying starts.

The first step in this programme is that the end unit 1 is emptied of milk by keeping the pump 3 in operation for about 15 seconds.

The second step is that the milk is ultrafiltrated as earlier and the concentrate is heat treated while on the other hand permeate is returned to the end unit 1 by way of the pipe line 16. when permeate has been transported to the end unit for 1–2 minutes, the pump 3 starts and during 10–15 seconds the rest of the milk left in the milk filter 4 and the pipe line 5 is pressed forward by permeate. In the meantime the ultra filter works with the milk transported to the same. When the balance tank 6 has been emptied of milk there is about 20 liters permeate in the end unit 1 and about 10 liters milk concentrate in the ultra filter 10 and its circulation path. The circulation pump is then stopped and the pump 3 of the end unit transports permeate to the balance tank 6. The pump 7 which is arranged after the balance tank 6 now transports permeate further to the ultrafilter and its circulation path in such a way that the milk concentrate is pressed out through the heat exchanger 12 to the cooling tank. When the pump 7 has transported about 10 liters permeate it stops and the circulation pump 9 starts. This works during about 2 minutes and rinses the filter surfaces with permeate. After this time period the circulation pump 9 stops and the pump 7 starts and presses forward the diluted milk now present in the ultra filter by means of the permeate volume which is left in the balance tank.

The emptying method described above concerns an ultrafiltration equipment where the milk concentrate is heat treated. The method will anyhow be the same, although the times and volumes are different, if the heat treatment unit 12 is dismissed or is located prior to the filter immediately after the pump 7. The same is the case if the membrane filter consists of a membrane module for reversed osmosis.

During some parts of the emptying phase the normal control of the level in the balance tank 6 carried through by the pump 7 is out of function. The pump 7 is then controlled by the control equipment of the ultra filter.

What is claimed is:

1. A method for membrane filtration of milk in connection with milking, at which the milk after the milking is transported first to an end unit and then to a balance tank and then to a circulation path including a membrane filter for yielding a permeate, characterized in that the permeate obtained from the membrane filter is returned to the end unit and is used for pressing forward milk from the end unit and from the balance tank when the milking is ended.

2. An apparatus for membrane filtration of milk in connection with milking, which comprises an end unit (1), a balance tank (6) and pumps (3, 7) to transport the milk from the end unit (1) and the balance tank (6) and a circulation path comprising a circulation pump (9) and a membrane filter (10) for yielding a concentrate and a permeate and pipe lines (11, 14) for the transport of the concentrate and the permeate, characterized by a pipe line (16) for returning the permeate to the end unit (91) and means for controlling the pumps (3, 7, 9).

3. A method for membrane filtration of milk in connection with milking of dairy animals, including the steps of:
   transporting the milk after milking to an end unit;
   transferring the milk from the end unit to a balance tank;
   transferring the milk from the balance tank to a circulation path including a membrane filter;
   filtering the milk in a membrane filter to yield a permeate; and
   returning the permeate to the end unit for pressing forward milk located in the end unit and milk located between the end unit and the membrane filter upon the ending of the transporting of milk to the end unit.

4. An apparatus for the membrane filtration of milk in connection with the milking of dairy animals comprising:
   an end unit for receiving milk;
   a balance tank in fluidic communication with the end unit;
   a first pump intermediate said end unit and said balance tank;
   a second pump downstream from said balance tank; and
   a milk circulation path, said path including a third pump, a membrane filter, a first pipeline for transporting milk concentrate from said membrane filter, a second pipeline for transporting permeate from said membrane filter to said end unit, and means for controllintg each of said pumps.

* * * * *

UNITED STATES PATENT AND TRADEMARK OFFICE
CERTIFICATE OF CORRECTION

PATENT NO. : 4,970,989
DATED      : November 20, 1990
INVENTOR(S): LIDMAN, Magnus It is certified that error appears in the above-identified patent and that said Letters Patent is hereby corrected as shown below:

On page 1, Item [73] Assignee:, delete "Alfa-Laval AB" and insert -- Alfa-Laval Agriculture International AB --.

Signed and Sealed this

Twenty-fifth Day of August, 1998

*Attest:*

BRUCE LEHMAN

*Attesting Officer*     *Commissioner of Patents and Trademarks*